US006894643B2

(12) United States Patent  
Guo et al.

(10) Patent No.: US 6,894,643 B2
(45) Date of Patent: May 17, 2005

(54) APPARATUS FOR AND METHODS OF RECEIVING A TRANSMISSION SIGNAL

(75) Inventors: Yingjie Jay Guo, Flackwell Heath (GB); Sunil Keshavji Vadgama, Thornton Heath (GB)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 10/343,343

(22) PCT Filed: Jul. 17, 2001

(86) PCT No.: PCT/GB01/03199

§ 371 (c)(1),
(2), (4) Date: Jan. 29, 2003

(87) PCT Pub. No.: WO02/11311

PCT Pub. Date: Feb. 7, 2002

(65) Prior Publication Data

US 2003/0146870 A1 Aug. 7, 2003

(30) Foreign Application Priority Data

Aug. 1, 2000 (GB) .............................. 0018859

(51) Int. Cl.[7] ................................................ G01S 3/16
(52) U.S. Cl. .................... 342/383; 342/372; 342/373
(58) Field of Search .............................. 342/372, 373, 342/374, 378, 383

(56) References Cited

U.S. PATENT DOCUMENTS

| 3,860,928 A | * | 1/1975 | Ehrlich ...................... 342/375 |
| 5,144,322 A | * | 9/1992 | Gabriel ....................... 342/383 |
| 5,327,143 A | | 7/1994 | Goetz et al. |
| 5,532,700 A | | 7/1996 | Lockwood |
| 5,933,446 A | | 8/1999 | Bond et al. |
| 6,064,338 A | | 5/2000 | Kobayakawa et al. |
| 6,130,643 A | * | 10/2000 | Trippett et al. ............. 342/380 |
| 6,347,234 B1 | * | 2/2002 | Scherzer ................... 455/562.1 |
| 6,370,182 B2 | * | 4/2002 | Bierly et al. ................ 375/140 |

FOREIGN PATENT DOCUMENTS

| EP | 0 892 504 A2 | 1/1999 |
| EP | 0 999 652 A1 | 5/2000 |
| GB | 2 344 221 | 5/2000 |

OTHER PUBLICATIONS

Tanaka et al. Pilot Symbol–Assisted Decision–Directed Coherent Adaptive Array Diversity for DS–CDMA Mobile Radio Reverse Link. EICE Trans. Fundamentals Dec. 12, 1997. pp. 2445–2454 vol. E80–A.

Grant et al. Antenna Arrays for Cellular CDMA Systems. IEEE 1998 pp. 404–410.

* cited by examiner

Primary Examiner—Dao Phan
(74) Attorney, Agent, or Firm—Katten Muchin Zavis Rosenman

(57) ABSTRACT

Apparatus for and methods of receiving a transmission signal, suitable for use in a cellular mobile communications system, are disclosed. The apparatus comprises a beam former (50) for receiving signals from a plurality of antenna elements, which received signals represent the transmission signal, and for modifying the received signals in accordance with a receiver beam pattern defined by control information input to the beam former (50). The apparatus also comprises estimating means (54) for producing an estimate of desired control information by combining predetermined data in the received signals with a replica of the predetermined data. The estimate of desired control information may be used to set the control information input to the beam former (50).

30 Claims, 10 Drawing Sheets

APPARATUS FOR AND METHODS OF RECEIVING A TRANSMISSION SIGNAL

The invention relates to apparatus for and methods of receiving a transmission signal. The invention has particular application in multi-user environments, such as cellular mobile communications systems. In particular, the invention can provide receiving apparatus for use in a base station of a cellular mobile communication system, in which the received beam pattern is adjusted, and methods of adjusting the received beam pattern in a base station of a cellular mobile communication system.

In a cellular mobile communications system, one of the main tasks of the base station is to detect the signal of each desired user (i.e. each active mobile station) in a multi-user and multi-path environment. In order to achieve satisfactory signal detection at low bit error rates, two conditions must be satisfied. Firstly, the power level of the signal received by the base station from the mobile station must be greater than a certain threshold value. Secondly, the multi-user interference (MUI), sometimes referred to also as multiple access interference (MAI), must be reduced to an acceptable level.

In order to increase received signal power levels and reduce interference, it is known to employ adaptive antennas at base stations to spatially filter received signals. Adaptive antennas comprise a plurality of spatially separated antenna elements and a beam former which adjusts the received beam pattern. The signals received by the antenna elements are processed by the beam former, which multiplies the signal received by each antenna element by a complex number, referred to as a weight value, and combines the thus modified signals. By an appropriate choice of weight values, a beam pattern of the antenna is produced such that, at the output of the beam former, the power level of a signal received from a particular desired direction is increased, while those of signals received from other directions are decreased. In this way the antenna gain can be used to increase the power level of a desired signal, while multi-user interference is reduced by suppressing signals received from other directions.

When the reception of a transmission signal from a mobile station first begins, the direction of reception of the signal is unknown, and furthermore the direction of reception may change over time as the mobile station moves. Adaptive antennas therefore employ adaption algorithms to converge on and then to track the transmission signal of a particular mobile station. For example, a least mean squares (LMS) algorithm may be employed which iteratively adjusts the weights of the beam former in response to an error signal.

A paper by Tanaka et al entitled "Pilot Symbol-Assisted Decision-Directed Coherent Adaptive Array Diversity for DS-CDMA Mobile Radio Reverse Link", IEICE Trans. Fundamentals, vol. E80-A, no. 12, December 1997, the subject matter of which is incorporated herein by reference, describes an adaptive antenna having a beam former, in which the beam former weights are adjusted by a minimum mean square error (MMSE) algorithm, which is a modification of the LMS algorithm. In that paper it is proposed that, when reception of a transmission signal first begins, the initial beam former weights be set to unity.

A problem with adaption algorithms such as that described in the Tanaka et al paper is that they may take a long time to converge, during which time satisfactory reception of the transmission signal may not be achieved. This problem is particularly acute where the initial beam former weights are far away from the optimum beam former weights, since a large number of iterations may need to be carried out before the beam former converges. For example, in the system described in the Tanaka et al paper, the convergence time is typically around 30 frames (0.3 s) with the result that, at the start of reception, around 30 frames of data are received under less than ideal conditions, and may even need to be discarded.

A related problem is that, in cellular mobile communications systems, power control of the communication channel is performed on the basis of a measure of the signal quality at the output of the beam former. If the adaption algorithm has not converged, the signal quality is lower than it would be if the algorithm had converged. Consequently a higher transmission power is used to compensate for the lower signal quality, which results in less efficient use of the transmitting apparatus. Furthermore, use of a higher transmission power tends to increase the interference caused to other channels, which reduces the overall efficiency of the transmission system.

A further problem is that, in cellular mobile communications system, the direction of reception of a transmission signal may change rapidly, or new paths may appear, for example as a user moves behind or away from a large building. The known adaption algorithms may take a long time to respond to the change in direction of the received signal.

In co-pending United Kingdom patent application number 9826271.0 in the name of Fujitsu Limited, the subject matter of which is incorporated herein by reference, a technique is disclosed for setting the initial weights of a beam former. The technique involves providing, in addition to a main beam former, a plurality of assistant beam formers, each of which spatially filters signals received from a different direction. By assessing which assistant beam former or group of assistant beam formers provides the best reception, a good estimate of the direction of arrival of the transmission signal can be obtained. This estimate is used to set the initial weights of the main beam former, and an adaption algorithm is then used to track the signal. By providing an estimate of the direction of arrival of the transmission signal, and using this estimate to set the initial beam former weights, the adaption algorithm can converge quickly to the transmission signal.

The technique described above allows the initial weights of the main beam former to be set in a relatively short period of time, but requires the provision of a number of assistant beam formers, which adds to the complexity of the system.

It is therefore desirable to provide a beam former which can converge rapidly onto a transmission signal, or respond quickly to a change in direction of a transmission signal, without the limitations mentioned above.

According to a first aspect of the invention there is provided apparatus for receiving a transmission signal comprising:

a beam former for receiving respective signals from a plurality of antenna elements, which received signals represent the transmission signal and contain predetermined data, and for modifying the received signals in accordance with a receiver beam pattern defined by control information input to the beam former;

processing means for performing an iterative adaption algorithm to produce iterative control information for adjusting the receiver beam pattern so as to facilitate reception of the transmission signal;

estimating means for producing an estimate of desired control information by combining the received signals with a replica of the predetermined data so as substantially to remove the effect of data modulation due to the predetermined data from the received signals; and selecting means for selecting as the control information input to the beam former either the iterative control information produced by the processing means, or the estimate of the desired control information produced by the estimating means.

The present invention is based on two important features. Firstly a good estimate of the optimum control information (beam former weights) can be obtained from the relative phase delays between signals received by respective antenna elements. Secondly, the relative phase delays can be estimated by combining (for example, by correlating) the signals received by the respective antenna elements with a replica of the predetermined data sequence. Thus, by combining the received signals with a replica of the predetermined data, a good estimate of the optimum control information can be obtained.

The present invention operates by combining the signals received by the respective antenna elements with a replica of the predetermined data sequence so as substantially to remove the effect of the data modulation due to the predetermined data from the received signals. Once the effect of the data modulation has been removed, the main components of the remaining signals are due to the relative phase delays due to the spacing of the antenna elements. These remaining signals are then used as an estimate of the optimum beam former weights.

The present invention may provide the advantage that a good estimate of the optimum control information can be produced in a short period of time and with relatively little processing. This estimate can then be used to set the control information, which may allow the beam former to converge more rapidly than if just an iterative adaption algorithm were used for the convergence. Since predetermined data are often available in transmission signals, the invention may require little modification of existing receiving apparatus, and thus may be implemented at low cost.

The present invention can advantageously be used whenever it is suspected that the iterative adaption algorithm is not fully converged. Thus, depending on the implementation, the estimating means may be adapted to produce an estimate of the desired control information and the selecting means may be adapted to select the estimate of the desired control information (i) when the transmission signal is first received, or (ii) when a new transmission path is allocated to the receiving apparatus, or (iii) in response to a signal indicating that the quality of the received signals has decreased, or (iv) periodically, or they may be adapted to perform any combination of the above.

The predetermined data may be one or more pilot symbols, or they may be training data or dummy data or a signature sequence, or any other data which are predetermined so that the receiving apparatus can replicate the predetermined data that are transmitted.

Preferably the estimating means is adapted to correlate the received signals with the replica of the predetermined data, in order to substantially to remove the effect of the data modulation due to the predetermined data from the received signals. This feature may also be provided independently, and thus in a modification of the first aspect of the invention there is provided apparatus for receiving a transmission signal comprising:

a beam former for receiving respective signals from a plurality of antenna elements, which received signals represent the transmission signal and contain predetermined data, and for modifying the received signals in accordance with a receiver beam pattern defined by control information input to the beam former;

processing means for performing an iterative adaption algorithm to produce iterative control information for adjusting the receiver beam pattern so as to facilitate reception of the transmission signal;

estimating means for producing an estimate of desired control information by correlating the received signals with a replica of the predetermined data; and selecting means for selecting as the control information input to the beam former either the iterative control information produced by the processing means, or the estimate of the desired control information produced by the estimating means.

For example, the estimating means may be adapted either to multiply the complex conjugate of the replica of the predetermined data by the received signals, or to multiply the complex conjugates of the received signals by the replica of the predetermined data. This may afford a convenient manner of carrying out the correlation, although any other operation which results in the effect of the data modulation due to the predetermined data being substantially removed from the received signal may be used instead.

The apparatus may further comprise storage means storing at least one of the replica of the predetermined data, and the complex conjugate of the replica of the predetermined data. If the complex conjugate of the replica of the predetermined data is stored, this may be used directly in the correlation process; otherwise means for producing the complex conjugate of the replica of the predetermined data, or the complex conjugates of the received signals, may be provided.

The estimating means may be adapted to combine a single received symbol with a replica of a predetermined data symbol contained therein to yield the estimate of the desired control information. Alternatively, where the received signals comprise a plurality of received symbols each containing a predetermined data symbol, the estimating means may be adapted to combine each of a plurality of received symbols with a replica of the predetermined data symbol contained therein, and to calculate a sum of the results of the combinations to yield the estimate of the desired control information. In this way, a number of symbols may be used to obtain an estimate of the desired control information, which may give a better estimate. The estimating means may perform a weighted sum, for example by giving a greater weight to later received symbols, or all symbols may be given equal weight.

The selection of the number of symbols which are used to produce the estimate of the desired control information is a trade off between the requirements for a good estimate and the requirements of fast convergence. The number N of symbols used to produce the estimate of the desired control information may be set in advance, for example to a value between 2 and 20, typically between 5 and 10. However, the number N of symbols which are used to produce the estimate may also be varied, and thus the apparatus may further comprise means for adjusting the value of N. As an example, if the channel quality is poor, a greater number of symbols may be needed in the estimation than if the channel quality is good. Thus the means for adjusting the value of N may be operative to adjust the value of N in dependence on an estimate of the quality of received signals representing the transmission signal. The value of N may alternatively be adjusted in dependence on other factors, such as received signal power or the number of predetermined symbols which are transmitted.

Where a number N of predetermined symbols are used to produce the estimate of the desired control information, this may be implemented by performing all N combinations and calculating the sum of the results of all N combinations to yield the estimate. Alternatively, the estimate may be produced at various intervals before all N symbols have been received, by calculating a sum of the combinations of the symbols that have been received, and setting the control information based on that partial sum. Thus, where the received signals comprise a plurality of received symbols each containing a predetermined data symbol, the apparatus may be operative to carry out a series of cycles, in which in each cycle the estimating means combines a received symbol with a replica of the predetermined data symbol contained therein, and in at least two cycles of the series the estimating means produces an estimate of the control information in dependence upon a cumulative sum of the result of the combination carried out in that cycle and the result of the combination carried out in one or more previous cycles, if any, and the selecting means selects that estimate as the control information input to the beam former.

By updating the control information at various intervals without waiting for all N symbols to be received, the beam former may converge at least partially from, for example, the first symbol, and then converge further with successive symbols. This may be particularly advantageous in systems where estimates of signal quality are used for power control, since estimates of signal quality may be obtained faster and more accurately, resulting in faster and more efficient power control.

The total number of cycles in the series may be two or more. The two cycles in which an estimate of the control information is produced may occur at any point in the series, Thus it will be understood that the control information may be updated after each symbol is received, or after certain numbers of symbols have been received.

The cumulative sum may be weighted, for example to give a greater weight to later received symbols, or all symbols may be given equal weight.

If the control information is set in a series of cycles in the way described above, then it may be that the processing means is not required and the estimating means can take full responsibility for generating the control information. Thus, in a second aspect of the present invention there is provided apparatus for receiving a transmission signal comprising:

a beam former for receiving respective signals from a plurality of antenna elements, which received signals represent the transmission signal and comprise a plurality of received symbols each containing a predetermined data symbol, and for modifying the received signals in accordance with a beam pattern defined by control information input to the beam former; and estimating means for producing an estimate of the control information, wherein the apparatus is operative to carry out a series of cycles, in which in each cycle the estimating means combines a received symbol with a replica of the predetermined data symbol contained therein so as substantially to remove the effect of data modulation due to the predetermined data symbol from the received symbol, and in at least two cycles of the series the estimating means produces an estimate of the control information in dependence upon a cumulative sum of the result of the combination carried out in that cycle and the result of the combination carried out in one or more previous cycles, if any, and applies that estimate as control information to the beam former.

Thus it will be appreciated that in each cycle the number of symbols that are used to produce the control information increases as more symbols become available. Typically, the number of symbols used increases from 1 up until a maximum value N, and then the control information continues to be generated using the last N symbols. Thus the apparatus may be adapted to operate in two phases, in which:

in a first phase, the apparatus is operative to carry out a first series of N cycles, in which in each cycle the estimating means combines a received symbol with a replica of a predetermined data symbol contained therein and calculates a cumulative sum of the result of the combination carried out in that cycle and the result of the combination carried out in one or more previous cycles, if any, to yield the control information input to the beam former, and in a second phase, the apparatus is operative to carry out a second series of cycles in which in each cycle the estimating means combines a received symbol with a replica of a predetermined data symbol contained therein and calculates a sum of the result of the combination carried out in that cycle and the results of the combinations carried out in the N previous cycles to yield the control information input to the beam former.

In this way, old symbols, which may have been received when the transmission conditions were different, are not used to generate the control information.

As discussed above, the selection of the number N is a trade off between the requirements for a good estimate and the requirements of fast convergence, and thus the apparatus may further comprise means for adjusting the value of N, for example in any of the ways described above with reference to the first aspect of the invention.

The ability to adjust the value of N is another important feature of the invention which may be provided independently, and thus in a third aspect of the present invention there is provided apparatus for receiving a transmission signal comprising:

a beam former for receiving respective signals from a plurality of antenna elements, which received signals represent the transmission signal comprise a plurality of received symbols each containing a predetermined data symbol, and for modifying the received signals in accordance with a beam pattern defined by control information input to the beam former;

estimating means for combining each of a number N of received symbols with a replica of the predetermined data symbol contained therein so as substantially to remove the effect of data modulation due to the predetermined data symbol from the received symbol, and for calculating a sum of the results of the combinations to yield the control information; and means for adjusting the value of N.

Typically the means for adjusting the value of N is operative to adjust the value of N in dependence on an estimate of the quality of received signals representing the transmission signal. For example, the means for adjusting the value of N may be operative to adjust the value of N in dependence on a measure of the signal to interference ratio. Alternatively, the value of N may be adjusted in dependence on other factors, such as received signal power or the number of predetermined symbols which are transmitted.

In either of the second or third aspects of the invention, the estimating means may be arranged to correlate the received symbol with a replica of the predetermined symbol contained therein.

In any of the above aspects where a number of predetermined symbols are used to produce the estimate of the desired control information, the estimating means may be adapted to calculate a weighted sum of the results of the combinations, in accordance with given weighting factors, for example to give a greater weight to later received symbols. The apparatus may further comprise means for adjusting the weighting factors. For example, the means for adjusting the weighting factors may be operative to adjust the weighting factors in dependence on an estimate of the quality of received signals representing the transmission signal.

The apparatus may further comprise means for estimating the quality of the received signals, such as means for measuring the signal to interference ratio.

In any of the above aspects, the beam former may comprise means for multiplying signals received from the antenna elements with respective weights, which weights depend upon the control information, and means for combining the thus multiplied signals. The estimating means may be adapted to combine the signals received from each of the antenna elements with a replica of the predetermined data to yield the estimate of the desired control information.

The invention may advantageously be used in a base station of a cellular mobile communications system, and thus there may be provided a base station for use in a cellular mobile communications system comprising receiving apparatus according to any of the above aspects. Receiving apparatus according to the present invention may additionally or alternatively be provided at a mobile unit in a cellular mobile communications system. However, the invention is not limited to use in a cellular mobile communications system, and may be used in any communications system where a transmission signal is received with a certain degree of directionality.

The receiving apparatus of the present invention may be implemented using software modules running on a processor. Thus, in a fourth aspect of the present invention there is provided apparatus for receiving a transmission signal, comprising:

a beam former which, in operation, receives respective signals from a plurality of antenna elements, which received signals represent the transmission signal and contain predetermined data, and modifies the received signals in accordance with a receiver beam pattern defined by control information input to the beam former;

and a processor programmed to perform the steps of:

(i) performing an iterative adaption algorithm to produce iterative control information for adjusting the receiver beam pattern so as to facilitate reception of the transmission signal;

(ii) producing an estimate of desired control information by combining the received signals with a replica of the predetermined data so as substantially to remove the effect of data modulation due to the predetermined data from the received signals; and (iii) selecting as the control information input to the beam former either the iterative control information, or the estimate of the desired control information.

In a fifth aspect of the present invention there is provided apparatus for receiving a transmission signal comprising:

a beam former which, in operation, receives respective signals from a plurality of antenna elements, which received signals represent the transmission signal and comprise a plurality of received symbols each containing a predetermined data symbol, and modifies the received signals in accordance with a beam pattern defined by control information input to the beam former; and a processor programmed to carry out a series of cycles, in which, in each cycle, the estimating means combines a received symbol with a replica of a predetermined data symbol contained therein so as substantially to remove the effect of data modulation due to the predetermined data symbol from the received symbol, and in at least two cycles of the series an estimate of the control information is produced in dependence upon a cumulative sum of the result of the combination carried out in that cycle and the result of the combination carried out in one or more previous cycles, if any, and that estimate is applied as control information to the beam former.

In a sixth aspect of the present invention there is provided apparatus for receiving a transmission signal comprising:

a beam former which, in operation, receives respective signals from a plurality of antenna elements, which received signals represent the transmission signal and comprise a plurality of received symbols each containing a predetermined data symbol, and modifies the received signals in accordance with a beam pattern defined by control information input to the beam former; and a processor programmed to combine each of a number N of received symbols with a replica of a predetermined data symbol contained therein so as substantially to remove the effect of data modulation due to the predetermined data symbol from the received symbol, to calculate a sum of results of the combinations to yield the control information, and to adjust the value of N.

Any of the features described above with reference to the first three aspects of the invention may also be applied to the fourth, fifth and sixth aspects of the invention.

In any of the fourth, fifth and sixth embodiments the beam former may be implemented in hardware, or as a software module running on the same or a different processor.

Analogous method aspects of the invention are also provided. Apparatus features of the invention may be applied to method aspects and vice versa. The invention also extends to computer programs and computer program products for carrying out any of the methods described herein and to computer readable media having stored thereon computer programs for carrying out any of the methods described herein.

Preferred features of the present invention will now be described, purely by way of example, with reference to the accompanying drawings, in which.

Figure 11A:
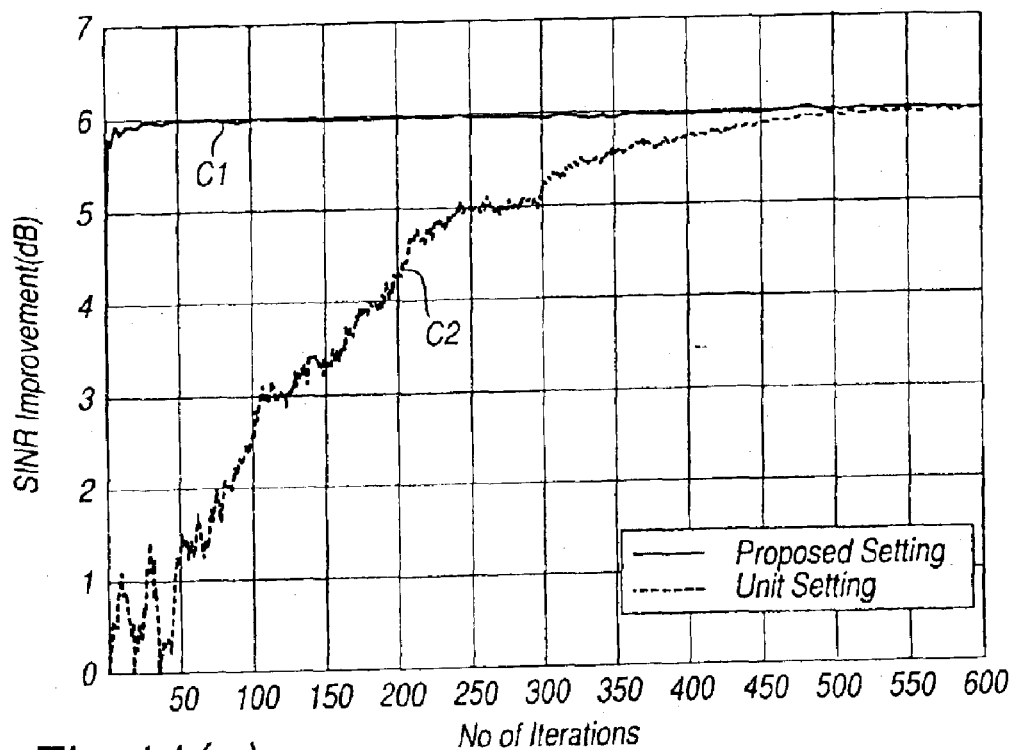
Figure 11B:
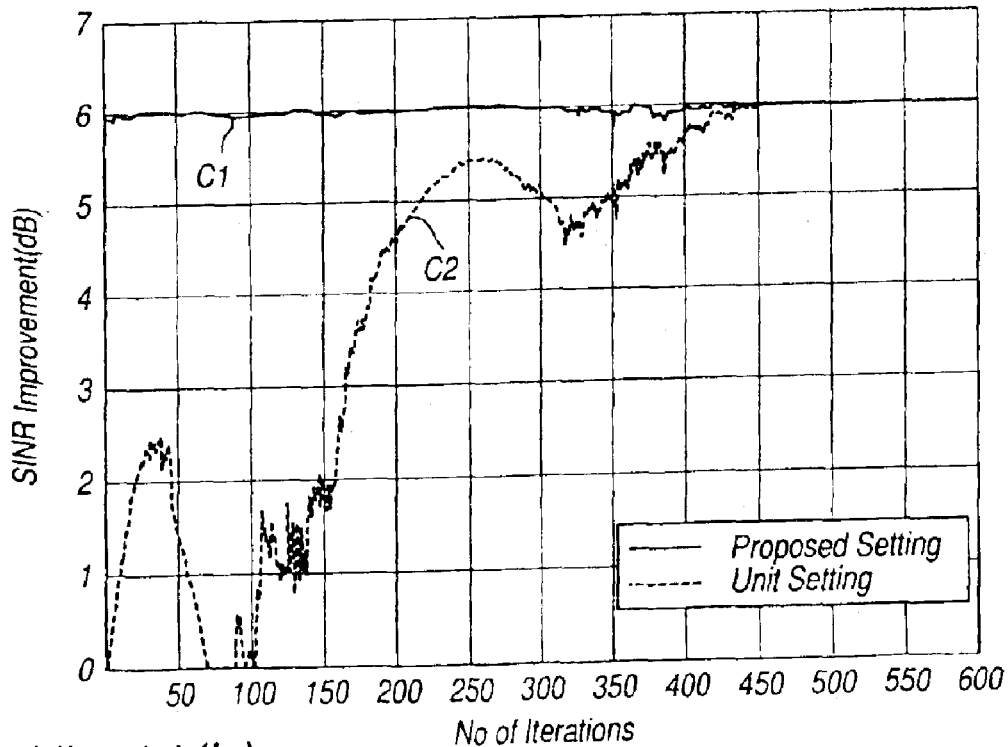
Figure 11C:
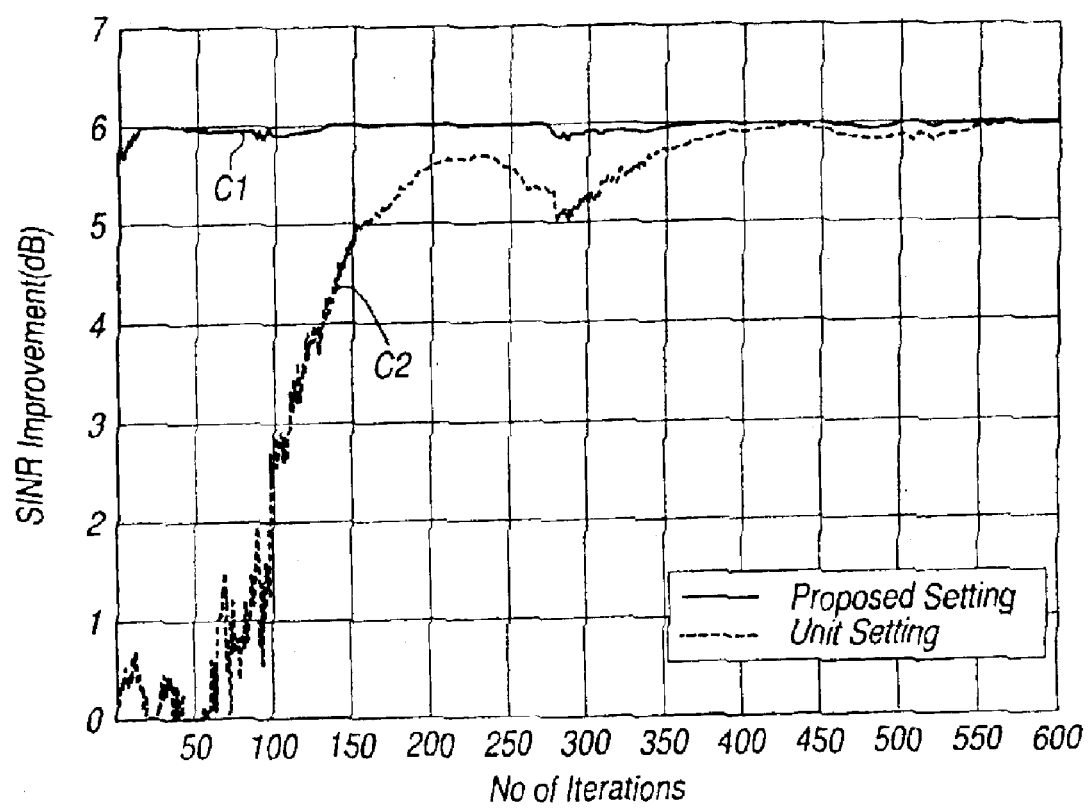

FIGS. 11(a) to 11(c) show comparisons of the performance of a beam former unit according to an embodiment of the invention with the performance of a prior art system.

OVERVIEW OF A CELLULAR MOBILE COMMUNICATIONS SYSTEM

Figure 1:
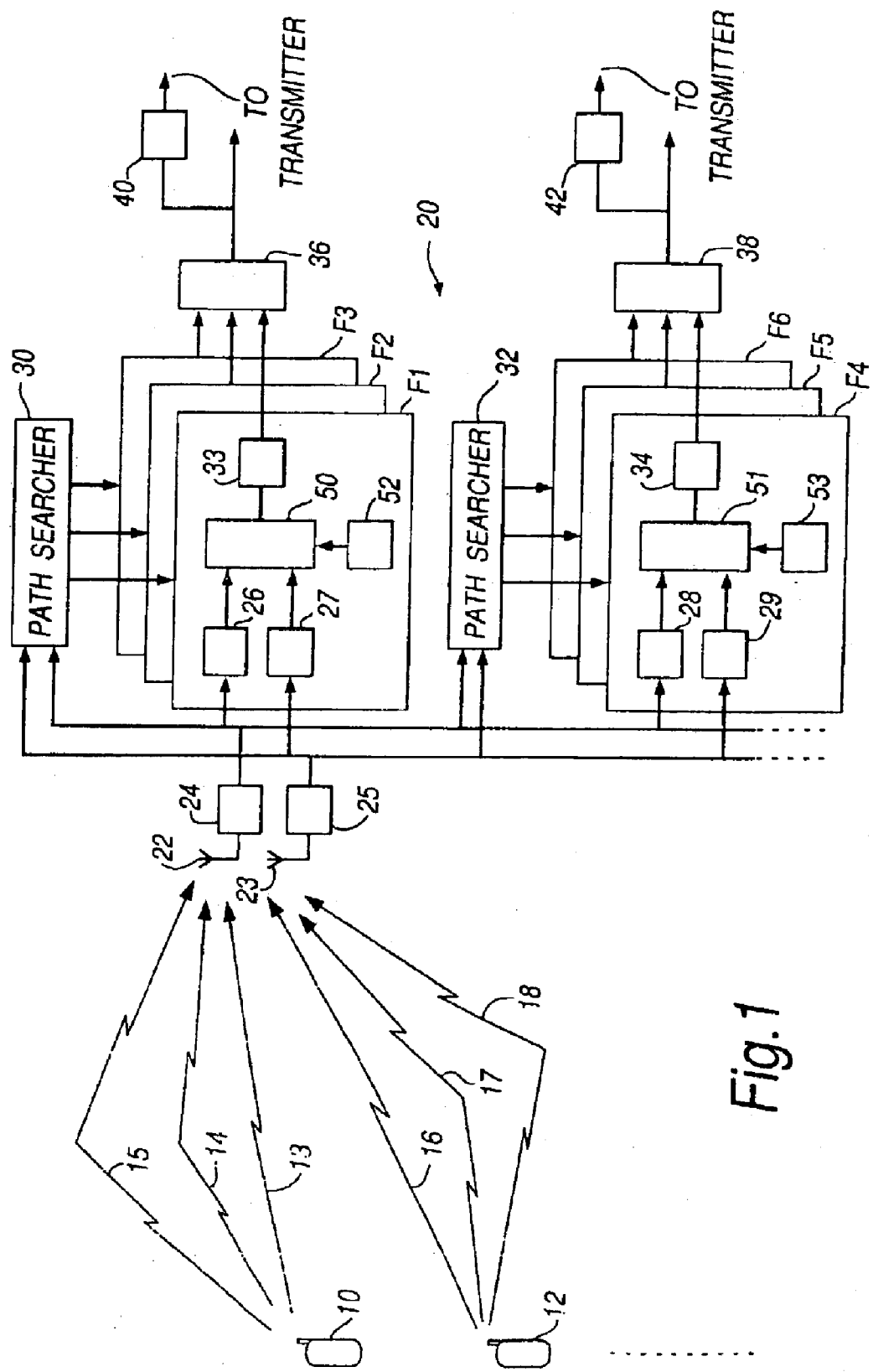
FIG. 1 shows an overview of a cellular mobile communications system.

An overview of a cellular mobile communications system is shown in FIG. 1. In FIG. 1, a plurality of mobile units 10, 12, which are typically mobile telephones or portable computing devices, transmit transmission signals to base station 20. Base station 20 also transmits signals back to mobile units 10, 12, so that communication is bi-directional. For simplicity, only the receiving part of base station 20 is shown in FIG. 1; the transmitting part is conventional and its design will be apparent to the skilled person. Also it will be understood that, while only two mobile units are shown in FIG. 1, typically a large number of mobile units would communicate with base station 20.

The various mobile units 10, 12 transmit their respective signals in the same frequency band using code division multiple access (CDMA). In CDMA, each mobile unit is assigned a unique spreading code which is used to spread a narrow band radio signal to a wide bandwidth in a unique manner. Corresponding despreaders are provided at the base station to despread the received signals.

FIG. 1 illustrates a case where the signal from mobile station 10 is received at base station 20 via direct path 13 and reflected paths 14 and 15, while the signal from mobile unit 12 is received by base station 20 via direct path 16 and reflected paths 17 and 18. Typically a number of transmission paths exist between a mobile unit and base station 20 due to, for example, reflections from large buildings. These different paths will have different lengths and directions and, accordingly, the base station 20 receives a succession of reflections of the mobile unit's transmission signal which have different respective delays and angles of arrival.

At the base station 20, a plurality of independent antenna elements 22, 23 are provided to detect, at different points in space, a transmission signal sent to the base station by a mobile unit. The antenna elements 22, 23 permit sampling of the received signal in space. In FIG. 1, three antenna elements are shown, but three, four or more antenna elements may be provided.

The respective receive signals produced by the antenna elements 22, 23 are fed to down converter and analog-to-digital converter (ADC) units 24, 25, which down convert the signals to baseband or an intermediate frequency and then digitize the down converted signals.

At the base station 20, path searchers 31 and 35 are provided which enable the base station to lock onto the best paths between the mobile units and the base station. Path searcher 31 establishes which transmission paths are present for mobile unit 10, and which of them are significant. It then allocates the paths considered to be the most significant to so-called "fingers" F1, F2, F3. Each finger processes the received signals in a manner appropriate to the transmission path to which that finger has been allocated. As existing paths fade and new paths appear, path searcher 31 reallocates paths to ensure optimum reception. Similarly, path searcher 35 allocates transmission paths from mobile unit 12 to fingers F4, F5, F6. In this way, the base station 20 can make full use of the various paths by which signals are received. In FIG. 1 three fingers per mobile unit are shown, but in practice more or fewer fingers may be provided for each mobile unit.

Finger F1 comprises despreaders 26, 27, beam former 50, tracking unit 52 and phase estimation and correction unit 33. Similarly, finger F4 comprises despreaders 28, 29, beam former 51, tracking unit 53 and phase estimation and correction unit 34. Corresponding elements are provided in the other fingers.

If, for example, finger F1 is allocated to a signal received from mobile unit 10 via path 13, then despreaders 26, 27 act to despread the received signals by using a replica of the spreading code of mobile unit 10. Similarly, if finger F4 is allocated to a signal received from mobile unit 12 via path 16, then despreaders 28, 29 act to despread the received signals by using a replica of the spreading code of mobile unit 12. Since each mobile unit uses a unique spreading code, only the signal of the corresponding mobile unit is despread, and thus the despreaders act to separate or demultiplex the signals from respective mobile units 10, 12.

The outputs of despreaders 26, 27 are fed to beam former 50, and the outputs of despreaders 28, 29 are fed to beam former 51. Each beam former is used to spatially filter a signal arriving from the corresponding mobile unit via a particular path. Beam former 50 operates under control of tracking unit 52, while beam former 51 operates under control of tracking unit 53. The output of beam former 50 is fed to channel estimation and control unit 33, while the output of beam former 34 is fed to channel estimation and control unit 34. The channnel estimation and control units act to ensure that the signals output by the various fingers have the correct phase, so that the signals may be combined.

The outputs of the fingers F1, F2, F3 are fed to combiner 36 and the outputs of fingers F4, F5, F6 are fed to combiner 38. Combiner 36 combines the outputs of fingers F1, F2, F3 to produce an output signal in which the signals received from mobile unit 10 via various paths are combined; similarly combiner 38 produces an output signal in which the signals received from mobile unit 12 via various paths are combined. Combiners 36, 38 are typically RAKE combiners, in which estimates of the quality of the various channels are used to optimize the combined signal. The outputs of combiners 36, 38 are therefore optimized versions of the signals received from respective mobile units 10, 12.

In CDMA systems, all signals received by a receiver need to be at about the same power level to prevent strong signals from suppressing weak ones. In mobile cellular networks, the mobile units are usually at different distances from the base station, and so if all mobile units transmitted at the same power level, the received power levels would vary considerably. In order to combat this problem the level of the transmitted power is carefully controlled.

Shown in FIG. 1 are power control units 40, 42. Power control units 40, 42 control the power of the signals transmitted by the mobile units 10, 12 using closed loop power control. Power control units 40, 42 estimate the quality of the channels, for example by measuring the signal to interference ratio (SIR) of the signals at the output of combiners 36, 38. The power control units 40, 42 then generate power commands in dependence on the estimates and transmit the power commands back to mobile units 10, 12. In response to these commands, the mobile units 10, 12 adjust their transmitted power so that all signals are received at the base station at approximately the same power level.

In order to provide estimates of channel quality for the combiners 36, 38 and the power control units 40, 42, the mobile units 10, 12 transmit a number of known pilot bits in their transmission signals. The pilot bits may be interleaved with the data, or a separate control channel may be provided for the pilot bits and other control information. A replica of the pilot bits is stored at the base station 20. By making use of the stored pilot bits, for example by correlating the received signal with the stored pilot bits, an estimate of the channel quality can be obtained. A pilot bit generator is provided to generate the pilot bits stored at the base station in synchronism with the incoming pilot bits so that the two can be compared. As will be described later, in an embodiment of the present invention the pilot bits can also be used by the beam formers 50, 51 to control the spatial filtering of the incoming signals.

Figure 2:
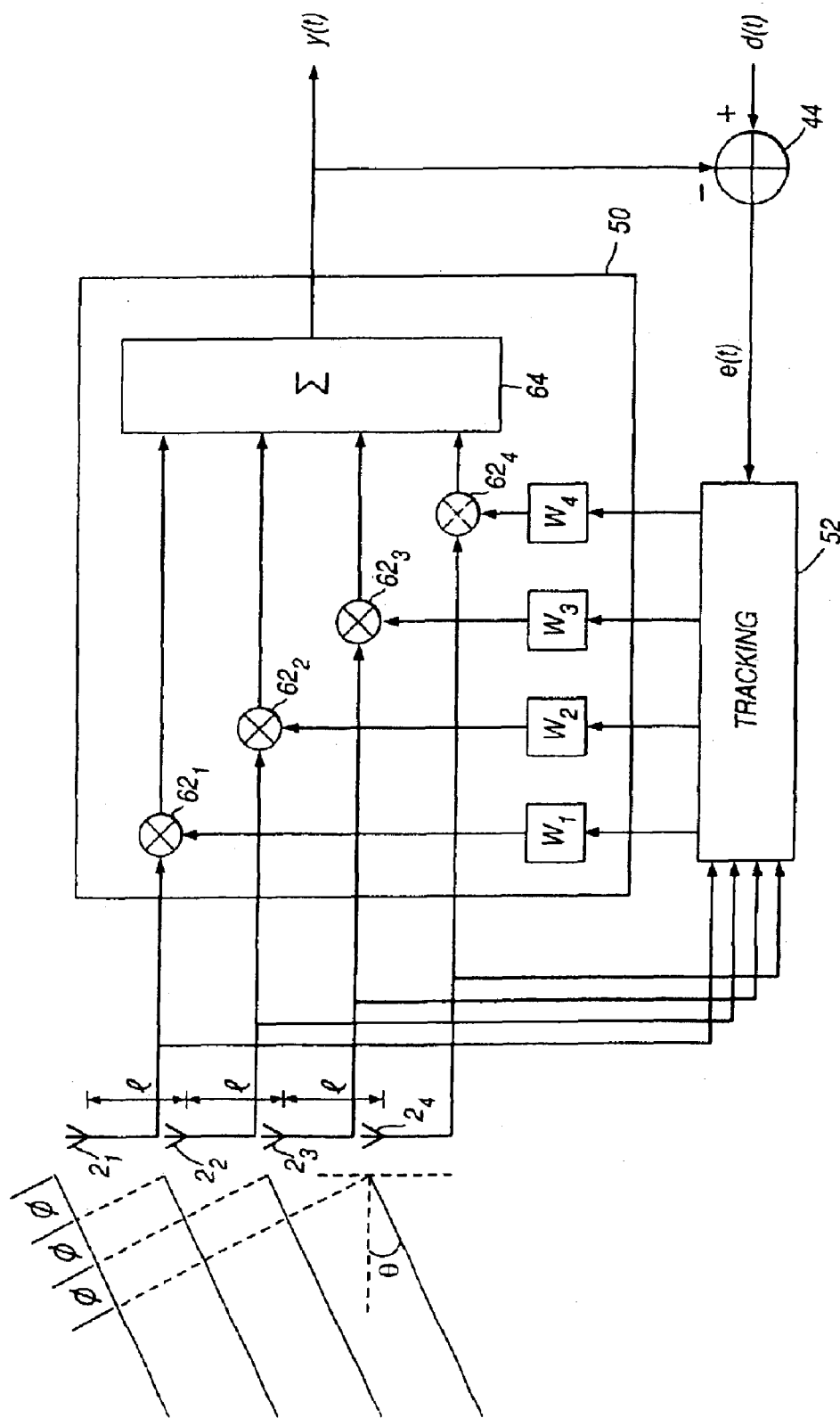
FIG. 2 shows details of a beam former.

The operation of digital beam former 50 will now be explained with reference to FIG. 2. In FIG. 2, it is assumed that four antenna elements $2_1, 2_2, 2_3, 2_4$ are provided, so that the beam former 50 has four inputs, for receiving one received signal from each antenna element. For simplicity, down converters, digitizers and despreaders are not shown in FIG. 2.

Referring to FIG. 2, digital beam former 50 includes a set of complex-conjugate multipliers $62_1, 62_2, 62_3, 62_3$ connected respectively for receiving the different receive signals. The complex multipliers multiply the receive signal applied thereto by respective complex weight values $W_1$, $W_2, W_3, W_4$. The weight values $W_1, W_2, W_3, W_4$ depend on the outputs from the tracking unit 52. The thus modified signals are then combined in summer 64 to yield a spatially filtered output signal y(t). The object of the spatial filtering carried out by the digital beam former 50 is to optimise the beam former response with respect to some prescribed criterion so that noise and interference are minimised in the output signal y(t).

Assuming that the mobile unit of interest is at a large distance from the base station, the respective nominal paths between the mobile unit, on the one hand, and the different antenna elements $2_1$ to $2_4$, on the other hand, along which the transmission signal generated by the mobile unit propagates will be fractionally different in length, so that there is a phase difference $\phi$, corresponding to the difference in path length, in the receive signals produced by adjacent antenna elements, for example the elements $2_3$ and $2_4$. The path-length differences, and hence the phase differences $\phi$, depend upon the angle of arrival $\theta$ of the transmission signal and the spacing l between adjacent antenna elements, as shown in FIG. 2 ($\phi \propto l \sin \theta$).

Sources of interference, on the other hand, such as other mobile units operating in the same area, will generally have a different angle of arrival from the angle of arrival $\theta$ of the wanted signal produced by the mobile unit of interest. In this case, it is possible to set the weights $W_1$ to $W_4$ applied to the complex multipliers $62_1$, to $62_4$ in such a way that the wanted signal, having the angle of arrival $\theta$, is received satisfactorily whilst the interfering signals, not having the angle of arrival $\theta$, are filtered out.

The output signal y(t) of the beam former 50 is compared with a reference signal d(t) using a subtraction element 44, and the resulting difference signal e(t), representing the difference between the actual output signal of the beam former and the reference signal, is applied to the tracking unit 52 which uses that error signal to adjust the weights $W_1$ to $W_4$ applied to the multipliers $62_1$, to $62_4$.

In a steady-state condition, in which the wanted and interfering signals each have a fixed angle of arrival at the receiving apparatus, there will be a fixed optimum set of beam former weight values $W_1$ to $W_4$ which satisfies the prescribed criterion for minimising noise and interference at the output of the beam former. An adaptive algorithm is employed in the tracking unit 52 which, in the steady-state condition shown in FIG. 2, would cause the weight values to converge to their optimum steady-state values and, thereafter, the noise and interference at the output of the beam former (or, equivalently, the difference signal e(t) representing the difference between the desired output signal d(t) and the actual output signal y(t) of the beam former) would remain at a minimum level related to the number of weights. However, in the real world, multipath propagation means that the transmission channel between the subject mobile unit and the base station is time-variant and, furthermore, the positions of the interfering signal sources (for example other mobile units) will change, with respect to one another and the base station, over time. Accordingly, the tracking unit 52 is required to update the beam former weight values continuously in accordance with the changing operating parameters.

Figure 3:
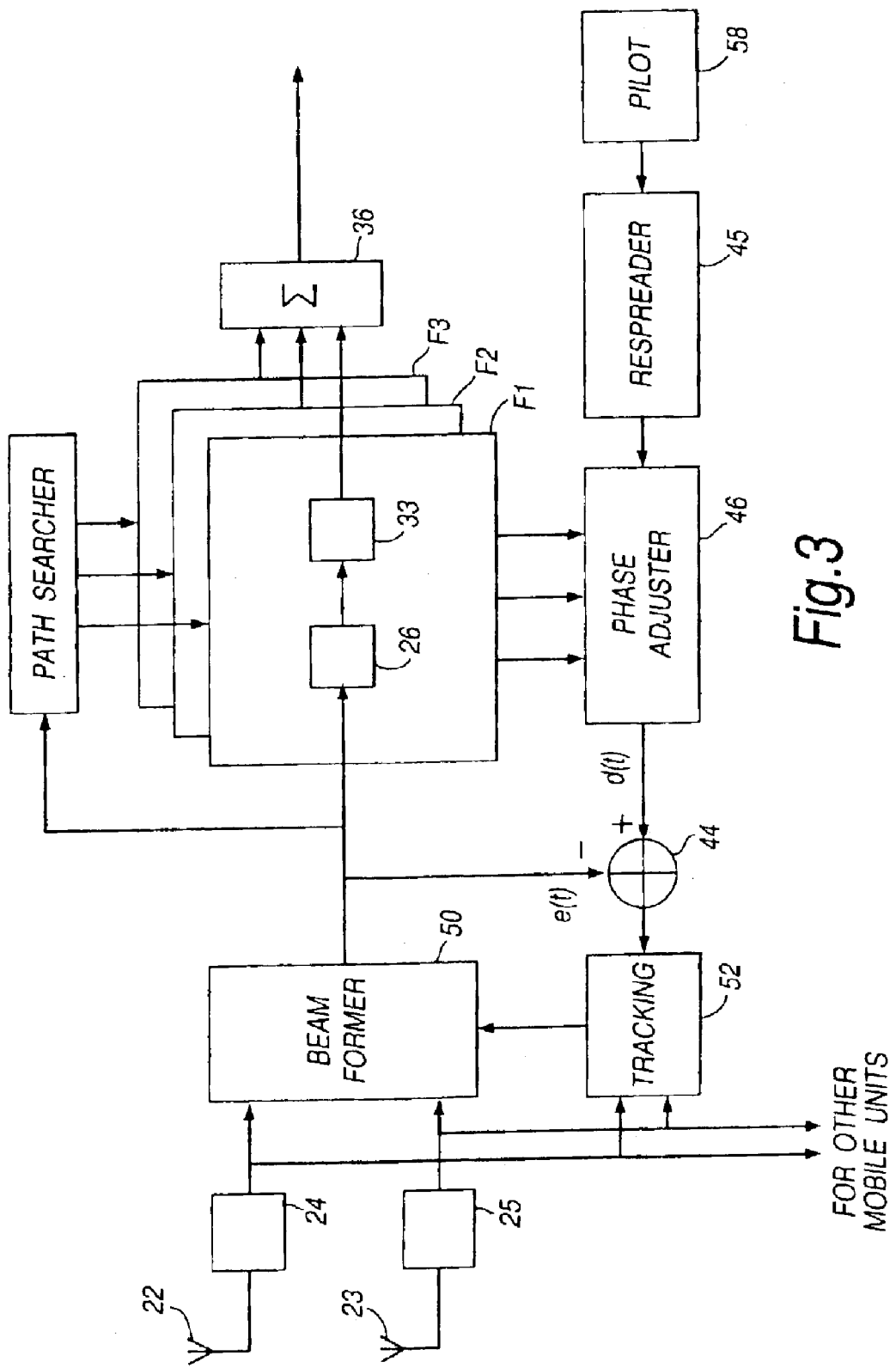
FIG. 3 shows details of a base station with a common beam former for a plurality of paths.

An alternative implementation of a base station is shown in FIG. 3, in which a common beam former 50 is provided for all of the fingers F1, F2, F3 allocated to a particular mobile unit. Referring to FIG. 3, each finger F1, F2, F3 comprises a despreader and channel estimation and correction unit. In order to provide the error signal d(t), a signal from a pilot signal generator 58 is fed to a respreader 45, which respreads the pilot signal according to the spreading code of the corresponding mobile unit. The phase of the respread signal is adjusted in phase adjuster 46 to bring it into the correct phase relationship with the incoming signal. The output of the phase adjuster is the reference signal d(t). The reference signal d(t) is compared with the output of the beam former 50, and the resulting difference signal e(t) is applied to the tracking unit 52, which uses that error signal to adjust the weights of the beam former 50.

The alternative implementation described above allows a single beam former to be used for two or more fingers. This implementation might be appropriate where signals from a mobile unit are being received by the base station from approximately the same direction.

Further information about digital beam forming techniques and related adaptive algorithms can be found, for example, in "Digital Beamforming in Wireless Communications", John Litra & Titus Kwok-Yeung Lo, Artech House Publishers, 1996, ISBN: 0-89006-712-0, the content of which is incorporated herein by reference.

The various features of a cellular mobile communications system described above may be used in conjunction with any of the embodiments of receiving apparatus which will now be described.

First Embodiment of Receiving Apparatus

Figure 4:
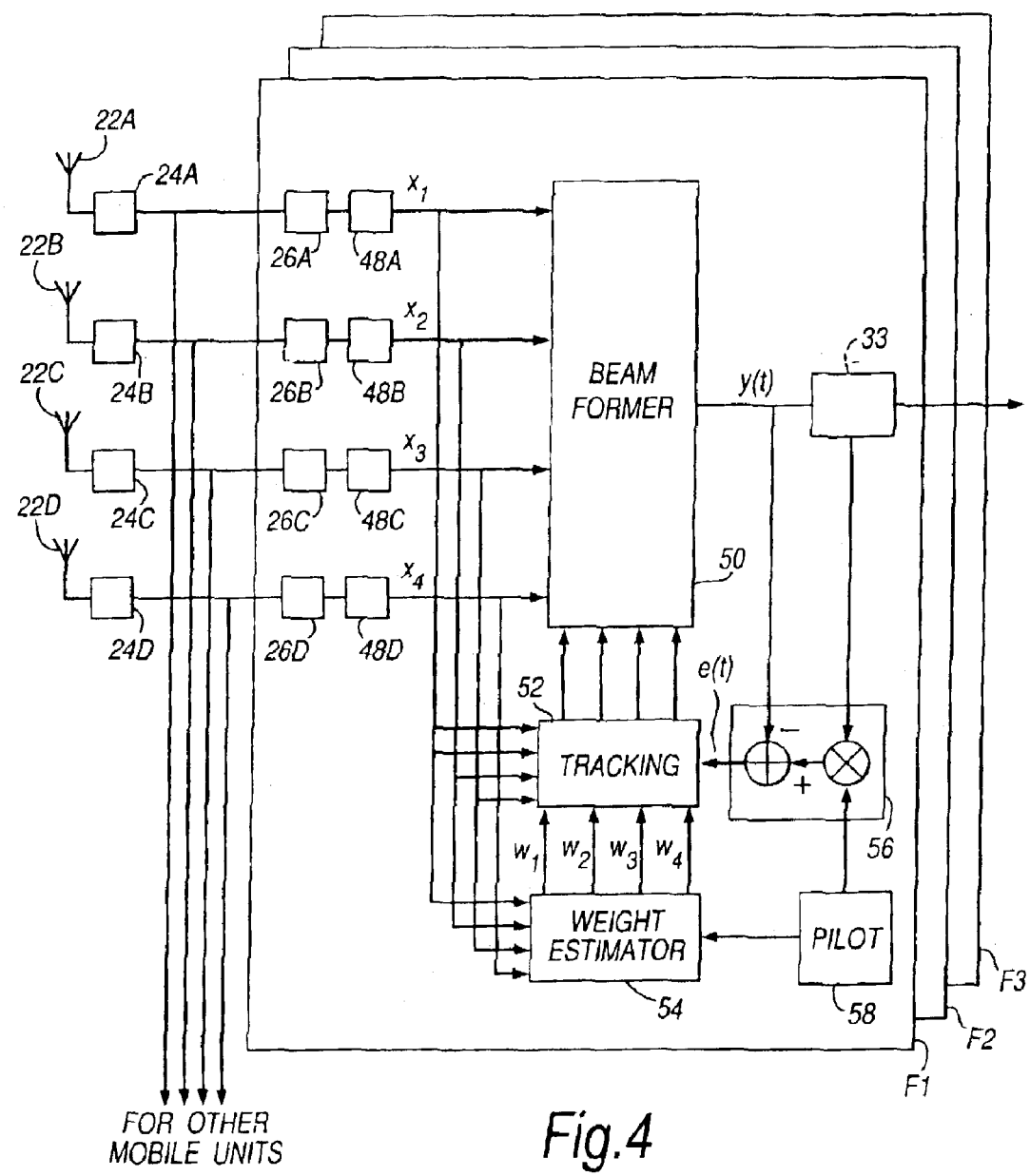
FIG. 4 shows a receiving apparatus according to a first embodiment of the invention.

FIG. 4 shows a first embodiment of a receiving apparatus. In this embodiment the receiving apparatus is located at a base station of a cellular mobile communications network. Referring to FIG. 4, an incoming radio wave (transmission signal from a mobile unit) is received by a plurality of spatially separated antenna elements 22A, 22B, 22C, 22D. The outputs of the antenna elements are down converted and digitized in units 24A, 24B, 24C, 24D, and fed to receiving apparatus for receiving the signals from the mobile units. In FIG. 4, receiving apparatus for receiving the signals from a single mobile unit is shown; similar apparatus is provided for other mobile units.

In the example shown in FIG. 4, fingers F1, F2 and F3 are allocated to various transmission paths by which the transmission signal from the mobile unit is received. Finger F1 comprises despreaders 26A, 26B, 26C, 26D, normalisers 48A, 48B, 48C, 48D, beam former 50, tracking module 52, weight estimator 54, error signal generator 56 and pilot bit generator 58. For convenience, only the details of finger F1 are shown; similar elements are provided in fingers F2 and F3.

In operation, despreaders 26A to 26D despread the received signals according to the spreading code of the relevant mobile unit, so that the output of each despreader corresponds to a signal received from that mobile unit by one of the antenna elements 22A, 22B, 22C, 22D. The outputs of the despreaders are fed to normalizers 48A to 48D. Normalizers 48A to 48D are optional and could be omitted. The outputs of the normalizers are normalized signals $x_1, x_2, x_3, x_4$ which are fed to beam former 50. Beam former 50 spatially filters signals received by antenna elements 22A to 22D by modifying the signals $x_1, x_2, x_3, x_4$ by respective weights and combining the modified signals. An error signal is produced by error signal generator 56, by comparing pilot bits at the output of beam former 50 with a replica of the pilot bits from pilot bit generator 58. Tracking module 52 then adjusts the weights of the beam former 50 so as to reduce the error signal by performing an iterative adaption algorithm, such as a normalized least mean squares (NLMS) algorithm. In this way the beam former 50 can converge onto and track an incoming signal received from a particular direction.

As is shown in FIG. 4, in addition to the tracking module 52, a weight estimator 54 is also provided. Weight estimator 54 is able to produce a good estimate of the optimum weights within a short period of time, and thus it is used to set the weights of the beam former 50 in various circumstances, in particular where it is suspected that the outputs of the tracking module 52 are not close to the optimum beam former weights.

The principles behind the first embodiment of the receiving apparatus will now be explained. It is assumed that the transmission signal arrives at antenna elements 22A to 22D as a plane wave. Assuming a linear spacing between the antenna elements, there will be a phase delay $\phi$ between the signals received by adjacent antenna elements 22A, 22B, 22C, 22D (see FIG. 2). After despreading and normalization, the incoming signal vector $x=[x_1\ x_2\ x_3\ x_4]^T$, where T denotes the transpose operation, has the values $x_1 = e^{-j\gamma}$
$x_2 = e^{-j\phi} e^{-j\gamma}$
$x_3 = e^{-j2\phi} e^{-j\gamma}$
$x_4 = e^{-j3\phi} e^{-j\gamma}$ where $\phi$ is a phase component due to the spacing of the antenna elements and $\gamma$ is a phase component due to data modulation.

When a pilot symbol is present in the incoming signal, the effect of the data modulation can be removed from the incoming signal vector by correlating the signal vector with a replica of the pilot symbol produced by pilot bit generator 58. The correlation may be performed, for example, by reversing the sign of the imaginary part of the pilot symbol to yield the complex conjugate of the pilot symbol, and then multiplying the incoming signal vector by the complex conjugate of the pilot symbol ($e^{j\gamma}$).

The result of the correlation is a vector, referred to herein as a weight vector $w=[w_1, w_2, w_3, w_4]^T$ in which $w_1 = \beta$
$w_2 = \beta e^{-j\phi}$
$w_3 = \beta e^{-j2\phi}$
$w_4 = \beta e^{-j3\phi}$ where $\beta$ is a scalar. In the present embodiment, the signals $w_1, w_2, w_3, w_4$ are then used to set the weights $W_1, W_2, W_3, W_4$ of the beam former 50.

Mathematically the operation can be written as $$w = \beta d^* x$$

where x is the incoming signal vector, d is the corresponding pilot symbol output by the pilot bit generator 58, and * denotes the complex conjugate.

Figure 5:
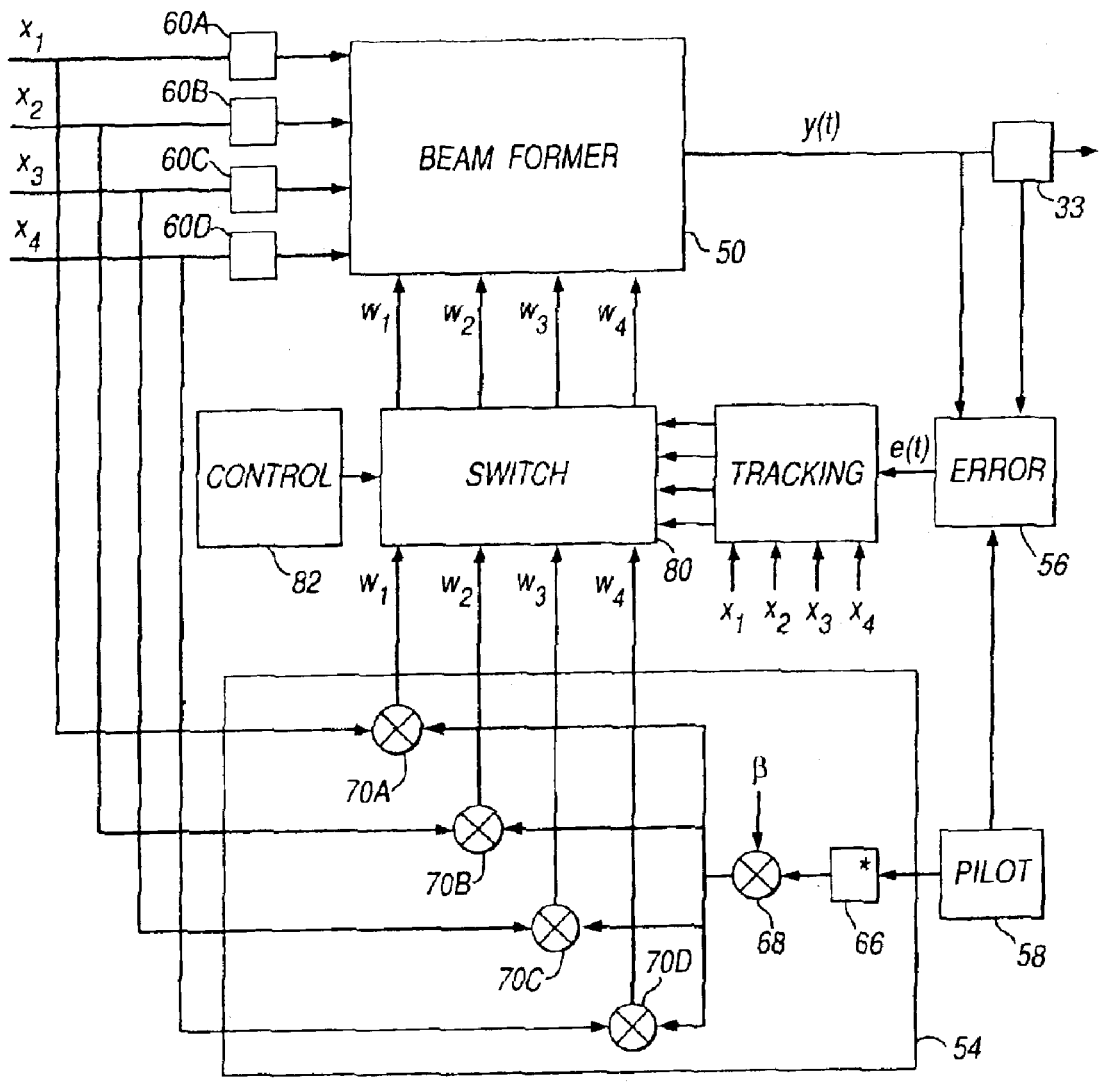
FIG. 5 shows details of the receiving apparatus according to the first embodiment.

Details of receiving apparatus according to the first embodiment are shown in FIG. 5. Referring to FIG. 5, delay elements 60A, 60B, 60C, 60D, beam former 50, tracking module 52, error signal generator 56, pilot bit generator 58, weight estimator 54, switching module 80 and control unit 82 are provided. Weight estimator 54 comprises complex conjugator 66, multiplier 68 and multipliers 70A, 70B, 70C, 70D.

In operation, incoming signals $x_1, x_2, x_3, x_4$, and a pilot symbol from the pilot symbol generator 58 are input to weight estimator 54. In the weight estimator, conjugator 66 produces at its output the complex conjugate of the pilot symbol, that is, a version of the pilot symbol with the sign of the imaginary part reversed. In an alternative implementation, the pilot bit generator 58 generates the complex conjugate of the pilot symbol directly, in which case conjugator 66 is not required. Also, the complex conjugates of the incoming signals could be taken, rather than that of the pilot symbol.

The output of conjugator 66 is fed to multiplier 68 which multiplies the conjugate of the pilot symbol by a scalar $\beta$. The value of $\beta$ is chosen in accordance with the parameters of the adaption algorithm employed in the tracking module 52 to ensure that the adaption algorithm functions correctly; in one example the value of $\beta$ is set to the step-size of a NLMS algorithm. Alternatively the value of $\beta$ could be set to unity, in which case multiplier 68 need not be provided. Each of the incoming signals $x_1, x_2, x_3, x_4$ is then multiplied by the output of multiplier 68 in multipliers 70A, 70B, 70C, 70D to yield the signals $w_1, w_2, w_3, w_4$. The signals $w_1, w_2, w_3, w_4$ are fed to switching module 80, which supplies either the signals from the weight estimator 54, or the signals from the tracking module 52, to the beam former 50 in dependence on a control signal from a control unit 82. The outputs of the switching module 80 are used to set the weights $W_1, W_2, W_3, W_4$ of the beam former 50.

In normal (tracking) operation, switching module 80 feeds the signals from the tracking module through to the beam former 50. In certain circumstances, for example when the error signal is too large or the signal to interference and noise ratio is too low, or in other circumstances where it is suspected that the outputs from the tracking module are not close to the optimum beam former weights, switching module 80 feeds the signals from the weight estimator 54 through to the beam former 50 to set the weights of the beam former. Depending on the implementation, weight estimator 54 may set the weights of the beam former 50 when a signal from a mobile unit is first received by the base station, or it might set the weights of the beam former when path searcher 31 allocates a new path to beam former unit 28, or it may set the weights of the beam former when it is judged that the tracking module is not converged on the incoming signal, such as might happen if the direction of reception of the incoming signal changes suddenly, or it may set the weights of the beam former periodically, or any combination of the above may be implemented. Thereafter the tracking module 52 performs the final convergence to and tracking of the optimum values of the beam former weights.

The inputs $x_1$, $x_2$, $x_3$, $x_4$ to the beam former unit 50 are delayed by one symbol period in delay elements 60A, 60B, 60C, 60D. By delaying the incoming signals by one symbol period, the weight estimator 54 is able to use the signals $x_1$, $x_2$, $x_3$, $x_4$ to set the weights of the beam former to an approximation of their optimum values so that the beam former is already at least partly converged when it receives the signals $x_1$, $x_2$, $x_3$, $x_4$. In another implementation, the delay elements delay incoming signals by two or more symbols to allow greater convergence before the signals are fed to the beam former. In a further implementation, no delay elements are provided. This might be appropriate, for example, where one or more symbols can be discarded.

By setting the beam former weights to a good approximation of their optimum value, the tracking module 52 can converge far quicker than if the weights were not close to their optimum values. This can result in data being more reliably received at the beginning of a transmission, or when transmission conditions change. In addition, the channel estimations which are carried out at the start of a transmission for the combiners 36, 38 and the power control units 40, 42 are much more reliable. As mentioned above, in CDMA systems it is very important that fast power control is effected so that signals from all mobile stations are received at approximately the same power level. By providing a good estimation of the channel quality within a short period of time, the power control can be made faster and more accurate, which improves the overall efficiency of the system.

Second Embodiment of Receiving Apparatus

The second embodiment of the receiving apparatus corresponds generally to the first embodiment, except that a number of iterations of the correlation process are performed to obtain a more accurate estimate of the weights, before switching to the adaption algorithm.

Mathematically, the operation of a weight estimator in the second embodiment can be written as $$w = \frac{\beta}{N} \sum_{i=1}^{N} d_i * x_i$$

where $x_i$ is the ith incoming signal vector and $d_i$ is the corresponding pilot symbol output by the pilot bit generator 58.

The above operation may be referred to as a "fixed window" mode of operation, since a fixed number N of pilot symbols are used to estimate the optimum beam former weights. In practice, it may be preferred to set the beam former weights after each step of the summation, rather than waiting for the entire summation to be carried out. This operation can be represented as follows.

$$w_{k-1} = \frac{\beta}{K} \sum_{i=1}^{K} d_i * x_i \quad K = 1 \ldots N$$

In this way, the weights are first set to the initial estimate based on the first pilot symbol, and are then updated as successive pilot symbols are received. This operation may be referred to as an "expanding window" mode of operation, since the number of symbols used for weight estimation expands as more symbols become available.

Figure 6:
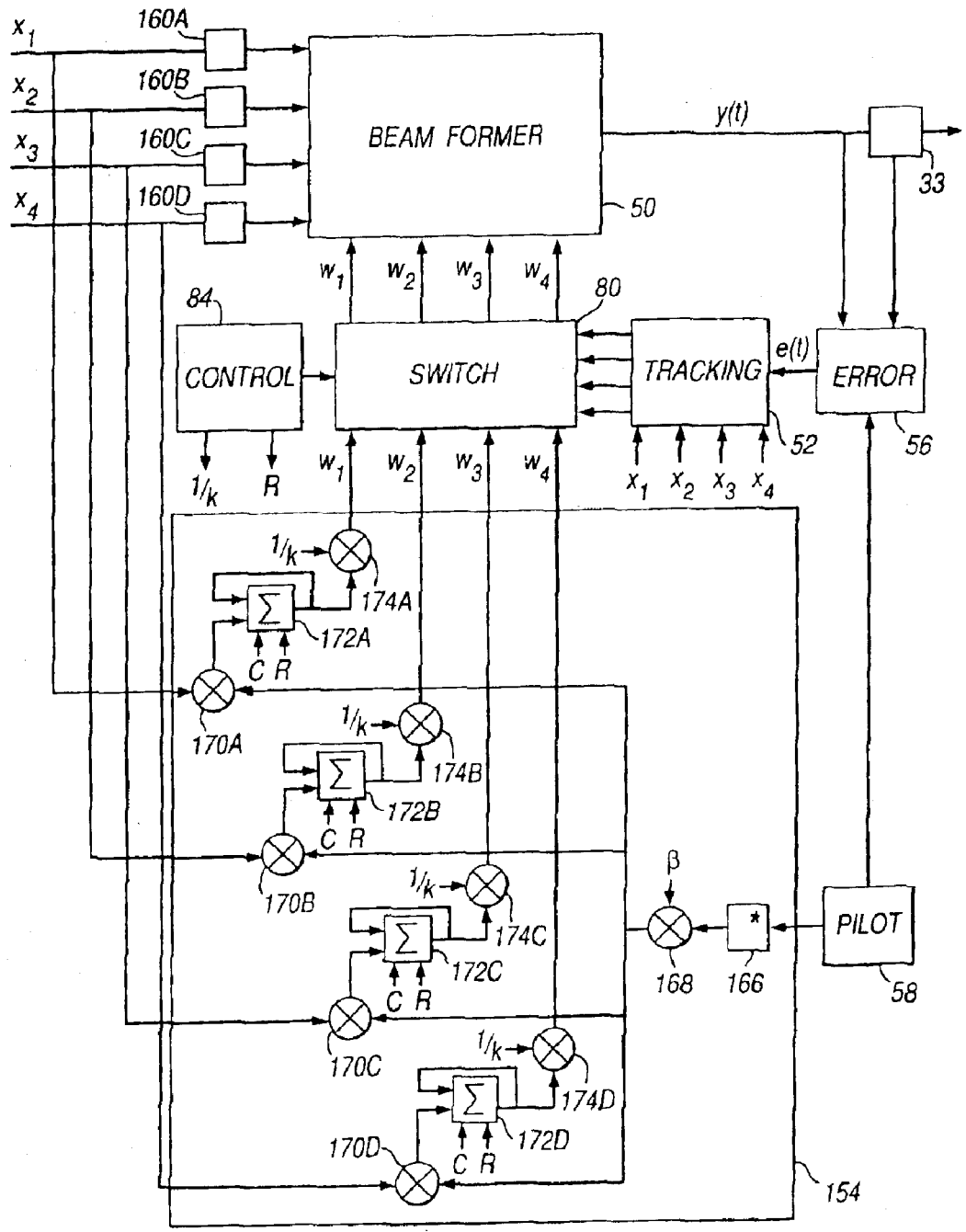
FIG. 6 shows details of a receiving apparatus according to a second embodiment of the invention.

Details of the receiving apparatus according to the second embodiment are shown in FIG. 6. Referring to FIG. 6, the receiving apparatus comprises delay elements 160A, 160B, 160C, 160D, beam former 50, tracking module 52, error signal generator 56, pilot bit generator 58, switching module 80, control unit 84 and weight estimator 154. Beam former 50, tracking module 52, error signal generator 56, pilot bit generator 58 and switching module 80 may be the same as those described above with reference to the first embodiment. Weight estimator 154 comprises conjugator 166, multiplier 168, multipliers 170A, 170B, 170C, 170D, summers 172A, 172B, 172C, 172D and multipliers 174A, 174B, 174C, 174D.

In operation, incoming signals $x_1$, $x_2$, $x_3$, $x_4$ and pilot symbols from the pilot symbol generator 58 are input to weight estimator 154. In the weight estimator, conjugator 166 produces at its output the complex conjugates of the pilot symbols. The output of conjugator 166 is fed to multiplier 168 which multiplies the conjugates of the pilot symbols by a scalar β. As in the first embodiment, the value of β is chosen in accordance with the parameters of the adaption algorithm employed in the tracker 52 to ensure that the adaption algorithm functions correctly. Each of the incoming signals $x_1$, $x_2$, $x_3$, $x_4$ is then multiplied by the output of multiplier 168 in multipliers 170A, 170B, 170C, 170D. The outputs of the multipliers 170A, 170B, 170C, 170D are then fed to summers 172A, 172B, 172C, 172D, which also have as inputs clock signals C and reset signals R. With each clock cycle, the output of each summer is fed back to its input, so that a cumulative sum appears at each summer output. The outputs of the summers 172A, 172B, 172C, 172D are multiplied by a value 1/K in multipliers 174A, 174B, 174C and 174D, where K is the number of cycles over which the summation has taken place, to yield the signals $w_1$, $w_2$, $w_3$, $w_4$. Multiplying the outputs of the summers by 1/K ensures that the signals $w_1$, $w_2$, $w_3$, $w_4$ are valid (running averages) for each cycle. The signals $w_1$, $w_2$, $w_3$, $w_4$ are fed to switching module 80, which supplies either the signals from the weight estimator 154, or the signals from the tracking module 52, to the beam former 50 in dependence on a control signal from control unit 84. The outputs of the switching module 80 are used to set the weights $W_1$, $W_2$, $W_3$, $W_4$ of the beam former 50.

In the present embodiment, the outputs of the beam former 154 are used to set the weights $W_1$, $W_2$, $W_3$, $W_4$ of the beam former 50 on each successive clock cycle. At the end of N cycles, the outputs of the summers 172A, 172B, 172C, 172D are set to zero by activating the reset inputs, and the outputs of the tracking module 52 are switched to the beam former 50 by the switching module 80, so that the tracking module performs the final convergence to and tracking of the optimum values of the beam former weights.

The inputs to the beam former unit 50 are delayed by at least one clock cycle in delay elements 160A, 160B, 160C, 160D so that the beam former is already partly converged for the first received symbol.

The clock signal C is a regenerated clock based on the symbol rate of the received signals. The reset signal R is generated by control unit 84 once a certain number N of clock cycles have occurred. The value 1/K is also generated by the control unit by counting the number of clock cycles that have occurred since the summation was started, and inverting that value.

Figure 7:
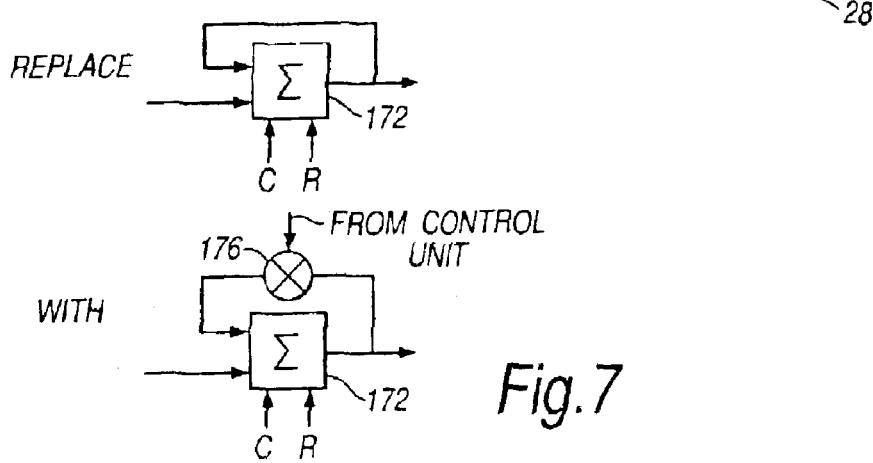
FIG. 7 illustrates a variant of the second embodiment.

In a variant of the second embodiment, the summers 172A, 172B, 172C, 172D give a weighting to the signals at their inputs, so that for example a more recent input is given a greater weighting than a less recent one. FIG. 7 shows how the summers 172A to 172D are modified to provide a weighted sum. Referring to FIG. 7, a multiplier 176 is provided in the feedback path of each of the summers. The multiplier multiplies the feedback signal by a fraction that is determined by the control unit 84. In this case the value of 1/K may also need to be adjusted.

In the second embodiment of the receiving apparatus, a good estimate of the optimum beam former weights is built up over a number of symbols. By updating the beam former weights with successive symbols, the beam former is partly converged from the first received symbol, and the convergence improves with successive symbols. This may be of particular use where the estimates of channel quality for the combiners 36, 38 and the power control units 40, 42 take place over a number of symbols. Since the beam former is partly converged from the first received symbol, the initial estimates of channel quality are better than if the beam former was not converged, which allows power control, and other functions which depend on the channel estimation such as path searching, to take place faster and with greater accuracy.

As in the first embodiment, weight estimator 154 may set the-beam former weights in various circumstances. For example, weight estimator 154 may set the weights of the beam former 50 when a signal from a mobile unit is first received by the base station, or it might set the weights of the beam former when path searcher 31 allocates a new path to beam former unit 28, or it may set the weights of the beam former when it is judged that the tracking module 52 is not converged on the incoming signal, such as might happen if the direction of reception of the incoming signal changes suddenly, or it may set the weights of the beam former periodically, or it may implement any combination of the above.

In the second embodiment, the number N of symbols over which the summation takes place may be fixed to a predetermined number, say 6 or 7, or the number may be varied in dependence on the circumstances. In one implementation, the value of N is varied in dependence on an estimate of the channel quality, for example by using a measure of the SIR. Thus, if the channel quality is judged to be poor, a larger number of symbols are used to set the beam former weights before switching to the beam tracking unit 52, while if the channel quality is judged to be good, a smaller number of symbols are used. In this case, the control unit 84 activates the reset signal after the appropriate number of cycles and hands control of the beam former weights to the tracking module 52.

Third Embodiment of Receiving Apparatus

A third embodiment of the receiving apparatus corresponds generally to the first and second embodiments, except that no tracking module is provided, and continually updated estimates of the optimum beam former weights from a weight estimator are used to track the optimum weights.

The weight estimator of the third embodiment operates in two phases. In a first phase, the number of pilot symbols used in the estimation of the optimum beam former weights is increased until a certain number N of symbols have been used. This phase corresponds to the expanding window mode of operation described above with reference to the second embodiment. In a second phase, the previous N symbols are used in the estimation. This phase corresponds to the fixed window mode of operation as described above, applied continually.

Figure 8:
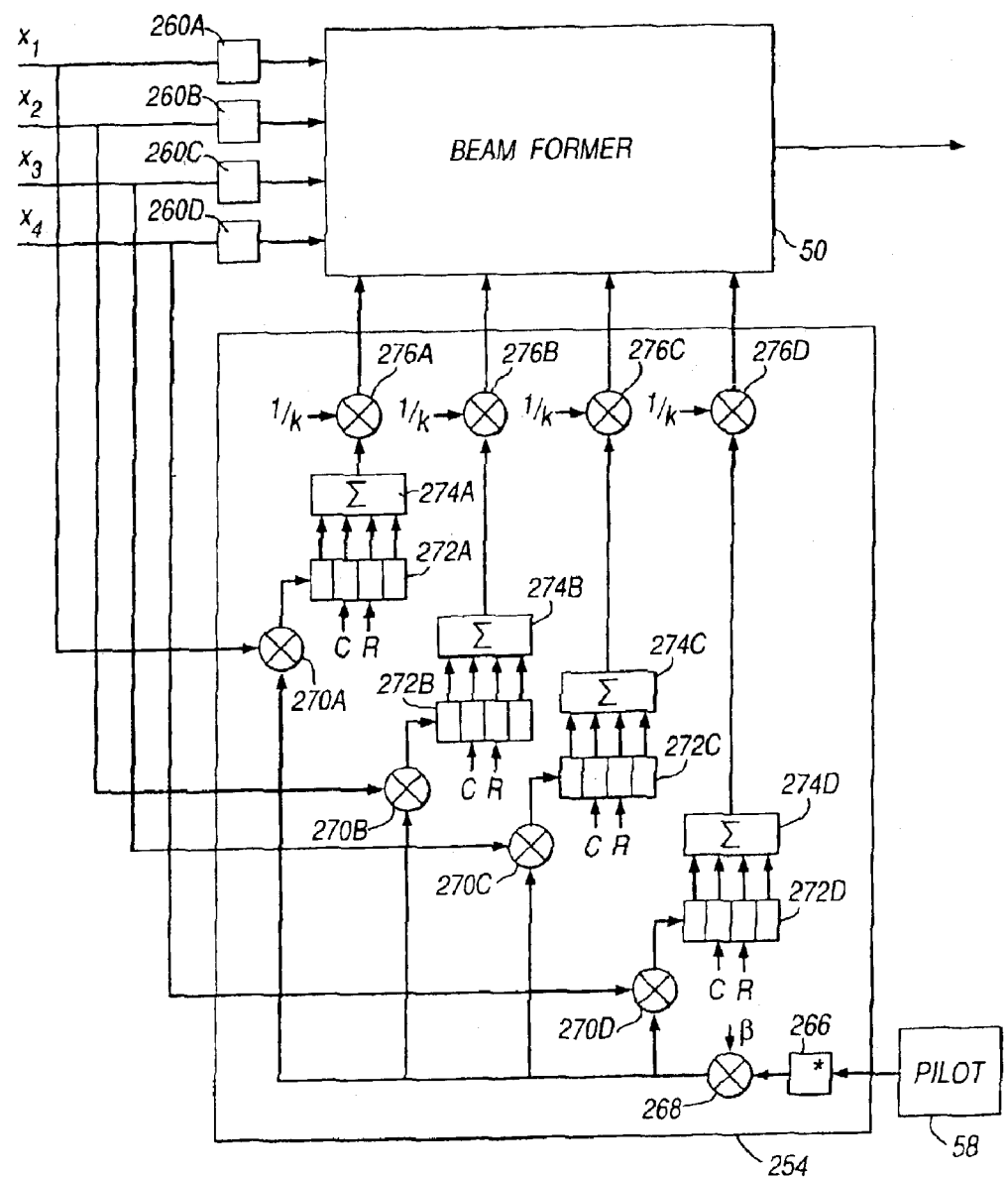
FIG. 8 shows details of a receiving apparatus according to a third embodiment of the invention.

Referring to FIG. 8, the beam former unit of the third embodiment comprises delay elements 260A, 260B, 260C, 260D, beam former 50, pilot bit generator 58 and weight estimator 254. Beam former 50 and pilot bit generator 58 may be the same as those described above with reference to the first and second embodiments. Weight estimator 254 comprises conjugator 266, multiplier 268, multipliers 270A, 270B, 270C, 270D, shift registers 272A, 272B, 272C, 272D and summers 274A, 274B, 274C, 274D.

In operation, incoming signals $x_1$, $x_2$, $x_3$, $x_4$ and pilot symbols from the pilot symbol generator 58 are input to weight estimator 254. In the weight estimator, conjugator 266 produces at its output the complex conjugates of the pilot symbols. The output of conjugator 166 is fed to multiplier 268 which multiplies the conjugates of the pilot symbols by a scalar $\beta$. $\beta$ may be unity, in which case multiplier 168 may be omitted. Each of the incoming signals $x_1$, $x_2$, $x_3$, $x_4$ is then multiplied by the output of multiplier 268 in multipliers 270A, 270B, 270C, 270D. The outputs of the multipliers 270A, 270B, 270C, 270D are then fed to shift registers 272A, 272B, 272C, 272D, which also have as inputs clock signal C and reset signal R. At the beginning of reception of the transmission signal, the shift registers 272A, 272B, 272C, 272D have all of their values set to zero by activating the reset signal R. Then, with each clock cycle, the outputs of the multipliers 270A, 270B, 270C, 270D are shifted through the shift registers, so that the outputs of the shift registers are the last K outputs of the multipliers. The outputs of the shift registers are then summed in summers 274A, 274B, 274C, 274D and multiplied by 1/K in multipliers 276A, 276B, 276C, 276D. The signals R and 1/K are generated by a control unit (not shown). The summers 274A, 274B, 274C, 274D may give equal weights to each of the signals at their inputs, or, for example, more recent values may be given greater weights, in which case the value of 1/K may need to be adjusted. The outputs of the summers yield signals $w_1$, $w_2$, $w_3$, $w_4$ which are used to update the weights $W_1$, $W_2$, $W_3$, $W_4$ of the beam former 50 on successive clock cycles.

When fewer than N pilot symbols have been received, the weight estimator 254 operates in an expanding window mode, since the number of values present in the shift registers increases with each clock cycle. When more than N symbols have been received, the weight estimator 254 operates in a fixed window mode of operation, since only the previous N outputs of the multipliers 270A, 270B, 270C, 270D are present in the shift registers 272A, 272B, 272C, 272D, all earlier outputs having been shifted out. Thus, in the third embodiment, a good estimate of the optimum beam former weights is produced from the first received pilot symbol, this estimate is updated as successive pilot symbols are received, and continually updated estimates are produced to track the optimum beam former weights.

In the steady state, only the previous N pilot symbols are used to estimate the optimum beam former weights, since in a mobile system the direction of reception of the wanted and interfering signals may change over time rendering old estimates of the optimum beam former weights invalid. However, in other implementations, for example where the mobile station and other sources of interference do not move during the course of transmission, the expanding window mode of operation could be used indefinitely.

Fourth Embodiment of Receiving Apparatus

In a fourth embodiment of the receiving apparatus, as in the third, no tracking module is provided, and continually updated estimates of the optimum beam former weights from a weight estimator are used to track the optimum weights. In the fourth embodiment, the number N of symbols on which the estimation of the optimum beam former weights is varied. In one implementation, the value of N is varied in dependence on an estimate of the channel quality, for example by using a measure of the SIR. Thus, if the channel quality is judged to be poor, a larger number of symbols are used to set the beam former weights, while if the channel quality is judged to be good, a smaller number of symbols are used.

Figure 9:
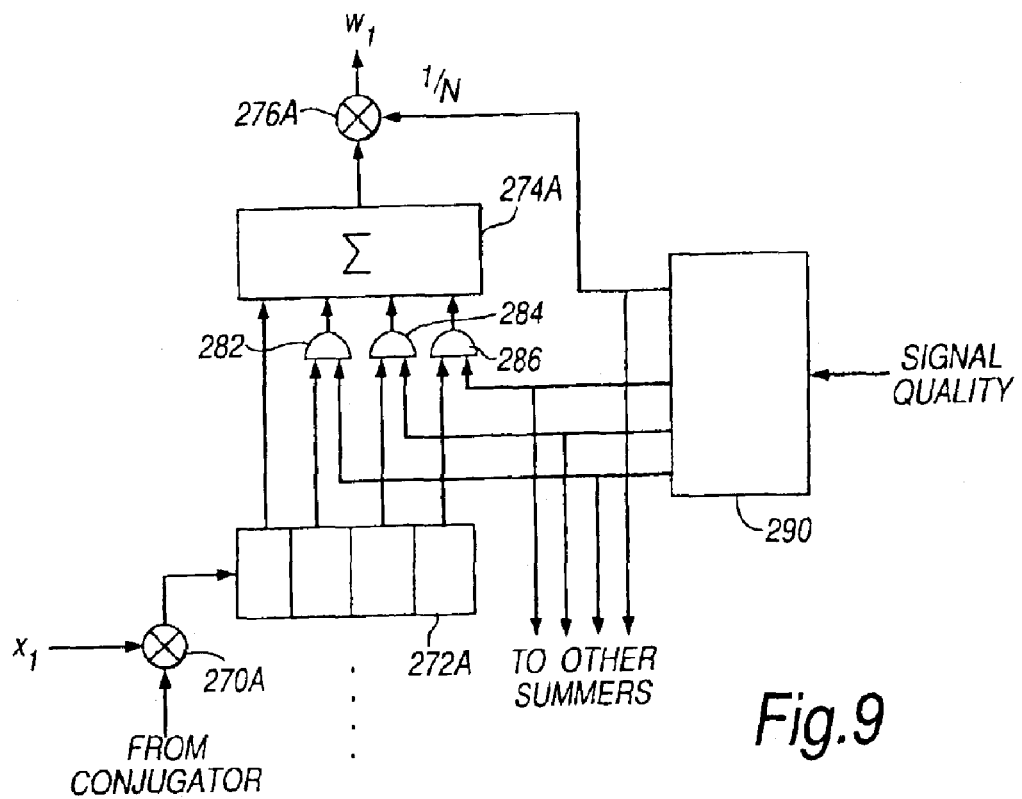
FIG. 9 shows details of a receiving apparatus according to a fourth embodiment of the invention.

Parts of a weight estimator according to the fourth embodiment will be described with reference to FIG. 9. In FIG. 9, for simplicity only those parts which are used to process the incoming signal $x_1$ are shown; similar parts are provided for processing the other incoming signals. The weight estimator of the fourth embodiment comprises the same elements as the third embodiment, with the addition of a unit 290 for adjusting the value of N, and a number of AND gates. AND gates, 282, 284 and 286 are provided between shift register 272A and summer 274A, while corresponding AND gates (not shown) are provided between the other shift registers 272B, 272C, 272D and their corresponding summers 274B, 274C, 274D.

In operation, the unit 290 takes as an input a measure of signal quality, which may be for example an estimate of the SIR as produced by one of the power control units 40, 42 shown in FIG. 1. Based on the measure of signal quality, the unit 290 decides on a suitable value for N, the total number of symbols to be used in estimating the optimum beam former weights. The unit 290 then produces signals for input to the AND gates 282, 284, 286, so that the last N symbols are used in the estimation. In the example shown in FIG. 7 the value of N may be set between 1 and 4 by appropriate choice of the inputs to the AND gates, although in practice the range of values of N may be much greater than this by providing larger shift registers and more AND gates. The unit 290 also produces the value 1/N which is input to multiplier 276A, to ensure that the output of summer 274A remains valid as N is varied.

Although in FIG. 9 the unit 290 is shown as varying the value of N in dependence on the signal quality, other factors could be used to vary N, such as a signal indicating that the direction of reception of the transmission signal has changed.

Figure 10:
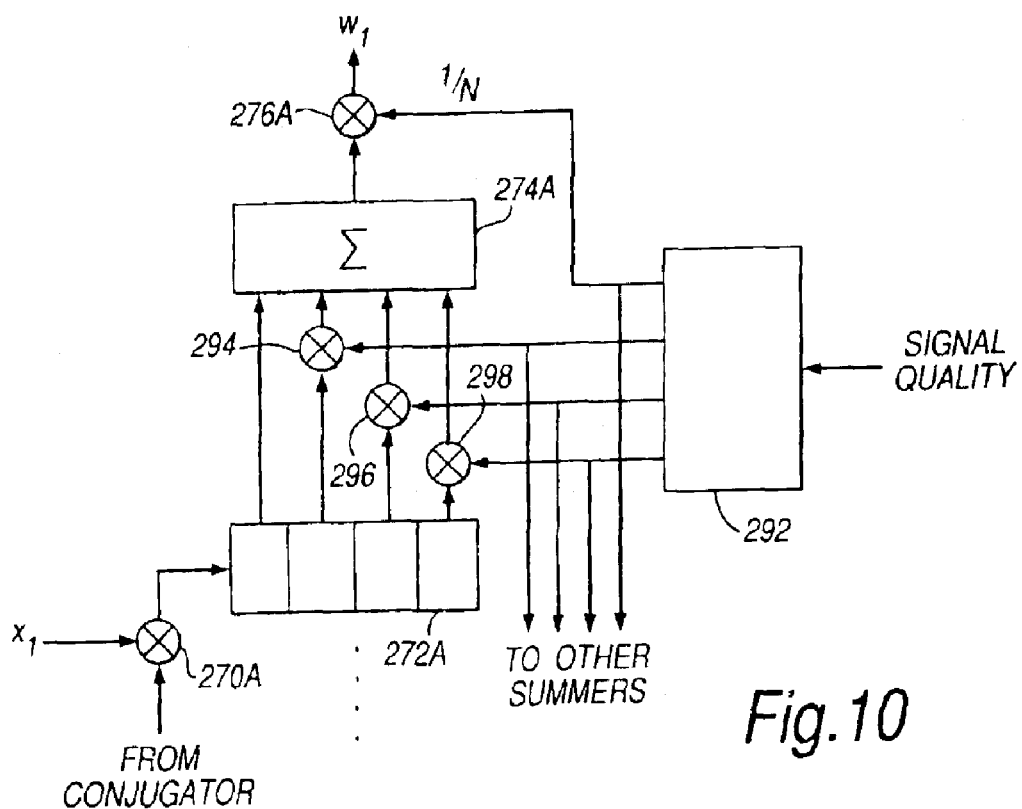
FIG. 10 shows details of a variant of the fourth embodiment.

In a variant of the fourth embodiment, different weights are given to the outputs of the shift registers in dependence on the signal quality. Referring to FIG. 10, instead of the AND gates 282, 284, 286 shown in FIG. 9 there are provided multipliers 294, 296, 298 between shift register 272A and summer 274A. The multipliers multiply the signals from the shift register 272A by respective weights which are set by unit 292. The unit 292 sets the weights of the multipliers in dependence on a measure of signal quality. In this variant, the window size stays constant but the weights are changed according to signal quality. This variant may also be used in conjunction with other embodiments of the receiving apparatus described above.

The various embodiments which have been described above are typically implemented using software modules running on a processor, for example a digital signal processor. The programming of such modules will be apparent to the skilled person from the description of the various functions. The skilled person will appreciate that such modules may be programmed on any appropriate processor using any appropriate programming language. Alternatively, some or all of the functions described above may be implemented using dedicated hardware.

As an illustration, comparisons of the first embodiment of the beam forming unit (curves c1) with a system using the NLMS algorithm with an initial weight setting of unity (curves c2) are shown in FIGS. 11(a) to 11(c). These figures each show the signal to noise and interference ratio (SNIR) improvement provided by the beam former as the iterations of the NLMS adaption algorithm progress. In the case of FIG. 11(a), the transmission signal is assumed to be received via an additive white Gausian noise (AWGN) channel with a signal to noise ratio of −2 dB while FIGS. 11(b) and 11(c) show results with Rayleigh fading channels with Doppler frequency of 80 Hz. In all cases it is assumed that there are thirty two randomly distributed users in an isolated sector and an optimized step size of $\mu$=0.02 is used. It can be seen that the proposed settings can reduce the convergence time of the NLMS algorithm from between 400 and 500 symbols to about 20 symbols. Also, with more than 5 dB of array gain, the channel estimation becomes much more accurate and the required mobile transmit power can be about 5 dB lower.

It will be understood that the present invention has been described above purely by way of example, and modifications of detail can be made within the scope of the invention. For example, features described above with reference to one embodiment or variant may be applied to other embodiments or variants. Also, the invention is not limited to use with cellular mobile communications systems, but may be applied to any communications system where a signal is received with a certain degree of directionality. The invention may be used with multiplexing techniques other than CDMA, such as Time Division Multiple Access (TDMA), Frequency Division Multiplexing (FDM) or any other appropriate multiplexing technique.

Each feature disclosed in the description, and (where appropriate) the claims and drawings may be provided independently or in any appropriate combination.

What is claimed is:

1. Apparatus for receiving a transmission signal comprising:

a beam former which receives respective signals from a plurality of antenna elements, the received signals representing the transmission signal and containing predetermined data, and which modifies the received signals in accordance with a receiver beam defined by control information input to the beam former;

a processor which performs an iterative adaption algorithm to produce iterative control information for adjusting the receiver beam pattern so as to facilitate reception of the transmission signal;

an estimator which produces an estimate of desired control information by combining the received signals with a replica of the predetermined data so as substantially to remove the effect of data modulation due to the predetermined data from the received signals; and a selector which selects as the control information input to the beam former either the iterative control information produced by the processor, or the estimate of the desired control information produced by the estimator, wherein the estimator is adapted to produce an estimate of the desired control information, and the selector is adapted to select the estimate of the desired control information, in response to a signal indicating that the quality of the received signals has decreased.

2. Apparatus according to claim 1 wherein the estimator is adapted to produce an estimate of the desired control information, and the selector is adapted to select the estimate of the desired control information, when the transmission signal is first received.

3. Apparatus according to claim 1 wherein the estimator is adapted to produce an estimate of the desired control information, and the selecting is adapted to select the estimate of the desired control information, when a new transmission path is allocated to the receiving apparatus.

4. Apparatus according to claim 1 wherein the estimator is adapted to produce an estimate of the desired control information, and the selector is adapted to select the estimate of the desired control information, periodically.

5. Apparatus according to claim 1 wherein the predetermined data are one or more pilot symbols.

6. Apparatus according to claim 1 wherein the estimator is adapted to correlate the received signals with the replica of the predetermined data.

7. Apparatus according to claim 1 wherein the estimator is adapted to multiply one of the replica of the predetermined data and the complex conjugates of the replica of the predetermined data with one of the received signals and the complex conjugates of the received signals.

8. Apparatus according to claim 1 further comprising store which stores least one of the replica of the predetermined data, and the complex conjugate of the replica of the predetermined data.

9. Apparatus according to claim 1 wherein the received signals comprise a plurality of received symbols each containing a predetermined data symbol, and the estimating is adapted to combine each of a plurality of received symbols with a replica of the predetermined data symbol, and to calculate a sum of the results of the combinations to yield the estimate of the desired control information.

10. Apparatus according to claim 9 wherein a number N of symbols are used by the estimator to produce the estimate of the desired control information, the apparatus further comprising which is operated to adjust the value of N.

11. Apparatus according to claim 1 wherein the received signals comprise a plurality of received symbols each containing a predetermined data symbol, and wherein the apparatus is operative to carry out a series of cycles, in which in each cycle the estimator combines a received symbol with a replica of the predetermined data symbol, and in at least two cycles of the series the estimator produces an estimate of the control information in dependence upon a cumulative sum of the combination carried out in that cycle and the result of the combination carried out in at least one previous cycle, if any, and the selecting means selects that estimate as the control information input to the beam former.

12. Apparatus for receiving a transmission signal comprising:

a beam former which receives respective signals from a plurality of antenna elements, the received signals representing the transmission signal and comprising a plurality of received symbols each containing a predetermined data symbol, and which modifies the received signals in accordance with a beam pattern defined by control information input to the beam former; and an estimator which produces an estimate of the control information, wherein the apparatus is operative to carry out a series of cycles, in which in each cycle the estimator combines a received symbol with a replica of the predetermined data symbol so as substantially to remove the effect of data modulation due to the predetermined data symbol from the received symbol, and in at least two cycles of the series the estimator produces an estimate of the control information in dependence upon a cumulative sum of the result of the combination carried our in that cycle and the result of the combination carried out in at least one previous cycle, if any, and applies that estimate as control information to the beam former.

13. Apparatus according to claim 12 wherein the apparatus is adapted to operate in two phases, in which:

in a first phase, the apparatus is operative to carry out a first series of N cycles, in which in each cycle the estimator combines a received symbol with a replica of a predetermined data symbol and calculates a cumulative sum of the result of the combination carried out in that cycle and the result of the combination carried our in at least one previous cycle, if any, to yield the control information input to the beam former, and in a second phase, the apparatus is operative to carry out a second series of cycles in which in each cycle the estimator combines a received symbol with a replica of predetermined data symbol and calculates a sum of the result of the combination carried out in that cycle and the results of the combinations carried out in the N previous cycles to yield the control information input to the beam former.

14. Apparatus according to claim 13 further comprising a control unit operable to adjust the value of N.

15. Apparatus according to claim 1 wherein the received signals comprise a plurality of received symbols each containing a predetermined data symbol, and wherein said estimator is adapted to combine each of a number N of received symbols with a replica of the predetermined data symbol so as to substantially remove the effect of data modulation due to the predetermined data symbol from the received symbol, and calculate a sum of the results of the combinations to yield the control information; and wherein the apparatus further comprises a control unit operable to adjust The value of N.

16. Apparatus according to claim 15 wherein the control unit is operable to adjust the value of N in dependence on an estimate of the quality of received signals representing the transmission signal.

17. Apparatus according to claim 16 wherein the control unit is operable to adjust the value of N in dependence on a measure of the signal to interference ratio.

18. Apparatus according to claim 12 wherein the estimator is adapted to correlate a received symbol with a replica of the predetermined symbol.

19. Apparatus according to claim 9 wherein the estimator is adapted to calculate a weighted sum of the results of the combinations, in accordance with given weighting factors.

20. Apparatus according to claim 19 further comprising a control unit which adjusts the weighting factors.

21. Apparatus according to claim 20 wherein the unit is operable to adjust the weighting factors in dependence on an estimate of the quality of received signals representing the transmission signal.

22. Apparatus according to claim 1 further comprising a quality estimator which estimates the quality of the received signals.

23. Apparatus according to claim 1 wherein the beam former comprises a multiplier which multiplies signals received from the antenna elements with respective weights, which weights depend upon the control information, and a combiner which combines the thus multiplied signals.

24. Apparatus according to claim 1 wherein the estimator is adapted to combine signals received from each of the antenna elements with a replica of the predetermined data to yield the estimate of the desired control information.

25. A base station for use in a cellular mobile communications system, said base station comprising:

a receiving apparatus including a beam former which receives respective signals from a plurality of antenna elements, the received signals representing the transmission signal and containing predetermined data, and which modifies the received signals in accordance with a receiver beam pattern defined by control information input to the beam former;

a processor which performs an iterative adaption algorithm to produce iterative control information for adjusting the receiver beam pattern so as to facilitate reception of the transmission signal;

an estimator which produces an estimate at desired control information by combining the received signals with a replica of the predetermined data so as substantially to remove the effect of data modulation due to the predetermined data from the received signals; and a selector which selects as the control information input to the beam former either the iterative control information produced by the processor, or the estimate of the desired control information produced by the estimator, wherein the estimator is adapted to produce an estimate of the desired control information, and the selector is adapted to select the estimate of the desired control information, in response to a signal indicating that the quality of the received signals has decreased.

26. A method of receiving a transmission signal comprising the steps of:

receiving respective signals, representing the transmission signal and containing predetermind data from a plurality of antenna elements;

modifying the received signals in accordance with a receiver beam pattern defined by control information; performing an iterative adaption algorithm to produce iterative control information for adjusting the receiver beam pattern so as to facilitate reception of the transmission signal;

producing an estimate of desired control information by combining received signals with a replicia of the predetermined data so as substantially to remove the effect of data modulation due to the predetermined data from the received signals; and selecting as the control information for use in the modifying step either the iterative control information, or the estimate of the desired control information, wherein said step of producing an estimate of desired control information and said selecting step are performed in response to a signal indicating that the quality of the received signals has decreased.

27. A method of receiving a transmission signal, the method comprising a series of cycles, each cycle comprising the steps of:

receiving respective signals from a plurality of antenna elements, the signals representing the transmission signal and comprising a received symbol containing a predetermined data symbol;

modifying the received signals in accordance with a receiver beam pattern defined by control information; and combining the received symbol with a replica of the predetermined data symbol contained therein so as substantially to remove the effect of data modulation due to the predetermined data symbol from the received symbol;

wherein, in at least two cycles of the series, an estimate of the control information is produced in dependence on a cumulative sum of the result of the combination carried out in that cycle and the result of the combination carried out in at lest one previous cycle, if any, and that estimate is used as control information.

28. A method of receiving a transmission signal according to claim 26, wherein said respective received signals comprise a plurality of received symbols each containing a predetermined data symbol; and further including the steps of:

combining each of a number N of received symbols with a replica of the predetermined data symbol contained therein so as substantially to remove the effect of data modulation due to the predetermined data from the received symbol;

calculating a sum of results of the combinations to yield the control information; and adjusting the value of N.

29. Apparatus for receiving a transmission signal comprising:

a beam former which, in operation, receives respective signals from a plurality of antenna elements, which received signals represent the transmission signal and comprise a plurality of received symbols each containing a predetermined data symbol, and modifies the received signals in accordance with a beam pattern defined by control information input to the beam former; and a processor programmed to carry out a series of cycles, in which, in each cycle, an estimator combines a received symbol with a replica of a predetermined data symbol contained therein so as substantially to remove the effect of data modulation due to the predetermined data symbol from the received symbol.

and in at least two cycles of the series an estimate of the control information is produced in dependence upon a cumulative sum of the result of the combination carried out in that cycle and the result of the combination curried out in one or more previous cycles, if any, and that estimate is applied as control information to the beam former.

30. A method of receiving a transmission signal according to claim 26, wherein said receiving step is performed by a beam former and said performing step is executed by a program to perform the steps of:

(i) performing an iterative adaption algorithm to produce iterative control information for adjusting the receiver beam pattern so as to facilitate reception of the transmission signal;

(ii) producing an estimate of desired control information by combining the received signals with a replica of the predetermined data so as substantially to remove the effect of data modulation due to the predetermined data from the received signals; and (iii) selecting as the control information input to the beam former either the iterative control information, or the estimate of the desired control information.

* * * * *